United States Patent [19]
DenBesten

[11] Patent Number: 5,415,496
[45] Date of Patent: May 16, 1995

[54] STABILIZATION OF PRE-EXISTING LANDFILLS

[75] Inventor: Leroy E. DenBesten, Castleton, N.Y.

[73] Assignee: Denbesten Enterprises, Inc., South Schodack, N.Y.

[21] Appl. No.: 668,025

[22] Filed: Mar. 12, 1991

Related U.S. Application Data

[63] Continuation-in-part of Ser. No. 506,913, Apr. 9, 1990, which is a continuation-in-part of Ser. No. 424,068, Oct. 19, 1989, abandoned.

[51] Int. Cl.$^6$ .............................................. B09B 1/00
[52] U.S. Cl. .................................. 405/129; 405/128; 241/30
[58] Field of Search ............... 405/128, 129, 130, 131; 210/628, 520; 71/9, 901; 241/30, DIG. 38

[56] References Cited

U.S. PATENT DOCUMENTS

| | | | |
|---|---|---|---|
| 3,614,867 | 10/1971 | Nieman | 405/129 |
| 3,733,033 | 5/1973 | Cobey | 241/30 |
| 4,306,686 | 12/1981 | Urbanczyk | 241/30 X |
| 4,410,142 | 10/1983 | Carlson | 241/30 X |
| 4,643,111 | 2/1987 | Jones | 405/129 X |
| 4,678,375 | 7/1987 | Gagle et al. | 405/128 X |
| 4,781,944 | 11/1988 | Jones | 405/129 X |
| 4,834,300 | 5/1989 | Wojciechowski et al. | 405/129 X |

Primary Examiner—Dennis L. Taylor
Attorney, Agent, or Firm—Kane, Dalsimer, Sullivan, Kurucz, Levy, Eisele & Richard

[57] ABSTRACT

Landfill waste is transferred to a controlled composting plant where it is aerated, moistened and mixed to enhance and accelerate the composting of the landfill which is then returned to the landfill. When the existing landfill is unlined the returned composted landfill material is placed on a liner which is progressively expanded as the composting process is continued.

16 Claims, 1 Drawing Sheet

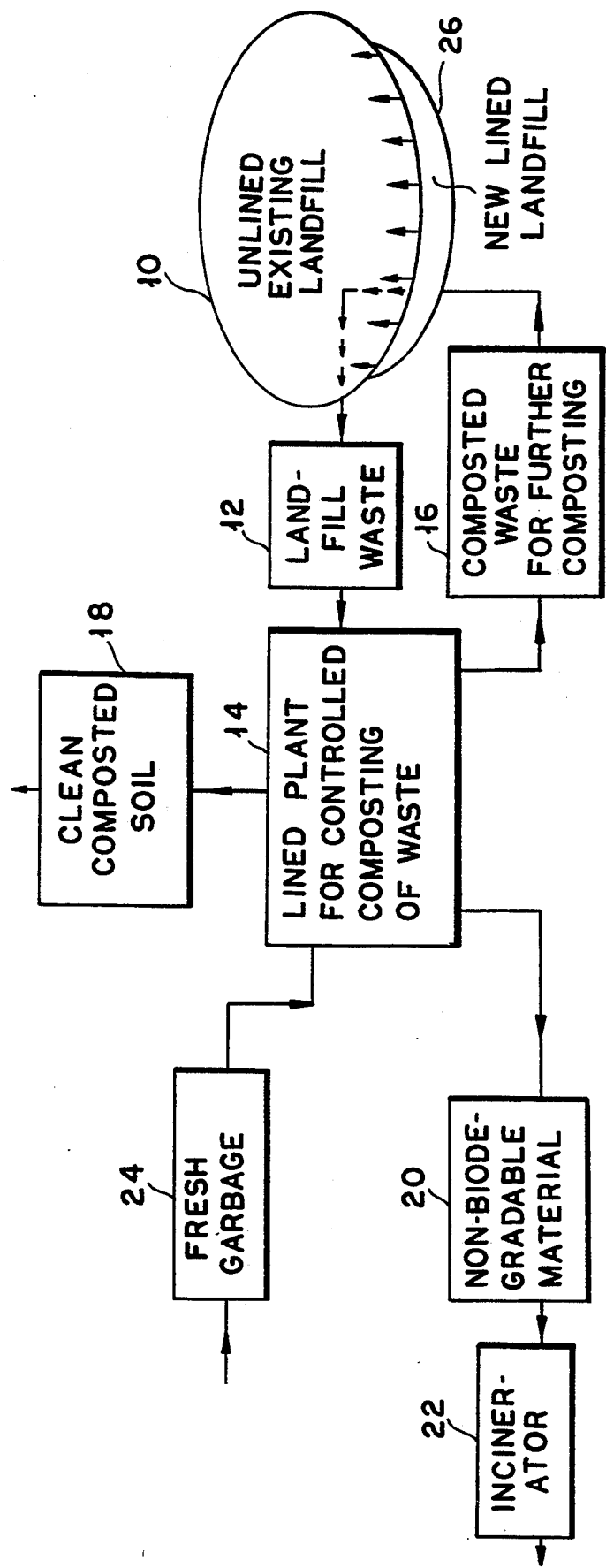

STABILIZATION OF PRE-EXISTING LANDFILLS

REFERENCE TO RELATED APPLICATIONS

This application is a continuation-in-part of U.S. patent application Ser. No. 506,913 filed Apr. 9, 1990 which is a continuation-in-part of U.S. patent application Ser. No. 424,068 filed Oct. 19, 1989, now abandoned.

BACKGROUND OF THE INVENTION

A majority of existing landfills have been erected without a liner that would assure against penetration of leachate into surrounding areas and contamination of existing water supplies and environs. In order to reduce if not eliminate this dilemma it would be desirable to develop a technique for lining the base of existing unlined landfills whether capped or working.

Of equal concern are the consequences of the state of the art technology of landfills construction. Typically daily garbage is spread over a landfill and then covered with daily cover of fresh dirt. This build up of layers is continued until the maximum permissible height of waste is reached. Then the landfill is capped with a relatively thick layer of clay which serves to seal the contents of the landfill. It has been discovered that this landfill construction technique hinders and obstructs the decomposition of biodegradable materials of the landfill because of the absence of air and water which are necessary ingredients for composting. Newspapers, several years old and grass clippings at various locations in the landfill remain fresh and intact as originally placed with no evidence of decomposition or composting present. The referenced patent application disclose successful techniques for enhancing and accelerating the composting of biodegradable materials of existing landfills.

SUMMARY OF THE INVENTION

A principal object of the present invention is to solve the above-noted problems by providing an alternate and somewhat improved technique for enhancing and accelerating the decomposition and composting of biodegradable materials of existing landfills.

Another object is to provide a process for effectively having existing unlined landfills.

A further object is to provide a process for exposing waste and garbage of non existing landfill as well as fresh garbage to controlled aeration, moistening and mixing to enhance and accelerate decomposition and composting.

BRIEF DESCRIPTION OF THE DRAWINGS

The single figure is a flow diagram of the process of the present invention for subjecting waste and garbage of a landfill as well as fresh garbage to controlled conditions and handling of the end product thereof while at the same time lining an unlined existing landfill.

DETAILED DESCRIPTION

In the drawing, the present invention contemplate an existing landfill 10 provided initially with or without a base liner to prevent seepage of leachate or as has been the usual practice without a liner. This landfill may be working or capped after it attained its maximum permissible size or height.

In order to cause the composting or decomposition of the biodegradable waste material of the landfill, this material 12 is taken by any conventional transporting means such as trucks, conveyors or the like from the landfill 10 to a plant 14 for exposing the waste material 12 to controlled composting conditions. In this connection, the waste material 12 will be aerated, moistened and mixed under controlled conditions and on a periodic basis. It has been found that under these circumstances, considerable composting occurs within 30 days. The plant 14 is preferably lined or provided with sealing means to prevent seepage of leachate which, when collected may advantageously be used to moistened the waste material 12. The waste material 12 may enter the plant 14 and be handled on a conveyor type system while being composted and then exited from the plant after a prescribed period of time. Provisions may be made for preventing, capturing or masking odors emanating from the waste material within the plant.

The composted waste material exiting from plant 14 may be handled in any one of several manners according to the invention depending on the objectives desired. The composted waste 16 may be returned to the landfill 10 for further composting in situ. On the other hand, clean composted soil 18 may be reclaimed and used as ordinary soil or for daily cover. Nonbiodegradable material 20 may be removed by the waste material either before or after controlled composting within plant 14 through screening or any other conventional procedures. This nonbiodegradable material 20 may be recycled or transported to an incinerator 22.

Inasmuch as the consumed airspace and size of the landfill 10 will be diametrically reduced by the practice of the present invention, fresh garbage 24 may be added to the landfill waste 12 for composting within the controlled atmosphere and conditions within the plant 14. This fresh garbage could be screened and the non biodegradable constituents handled in the same fashion as like material 20.

One of the more important attributes of this invention is the ability to convert an existing unlined landfill into a lined landfill to protect the surroundings from unwanted or harmful landfill leachate. As shown a new lined landfill section 26 may be started at any selected sector of landfill 10. The composted waste 16 from plant 14 may then be placed on the lined landfill section 26. This lined section 26 may then be progressively enlarged or advanced as depicted by arrows as landfill waste 12 is removed from neighboring or contiguous sections of unlined landfill 10 and processed within plant 14. This procedure is continued until all or the entire base of landfill 10 is lined.

Thus, the several aforenoted objects and advantages are most effectively attained. Although several somewhat preferred embodiments is shown and described herein, it should be understood that this invention is in no sense limited thereby and its scope is to be determined by the appended claims.

What is claimed is:

1. A process for lining an unlined existing landfill comprising:
   composting a selected sector of the landfill waste of the unlined landfill;
   lining the sector of the unlined landfill;
   sequentially composting contiguous sectors of the unlined landfill; and
   lining said contiguous sector of the unlined landfill until preselected sectors of the unlined landfill are lined.

2. The invention in accordance with claim 1 wherein the sector and sectors of the landfill are filled with composted landfill.

3. The invention in accordance with claim 1 wherein the selected sector of landfill waste is collected and transferred to a processing plant for controlled composting of the landfill waste.

4. The invention in accordance with claim 1 wherein the landfill waste is subjected to controlled composting by aerating, moistening and mixing the landfill waste in a predetermined fashion.

5. The invention in accordance with claim 4 wherein the controlled composting is done in a predetermined sequence.

6. The invention in accordance with claim 1 wherein the sector and sectors of the landfill are filled with substantially uncomposted landfill, the selected sector of landfill waste is collected and transferred to a processing plant for controlled composting of the landfill waste, the landfill waste is subjected to controlled compostion by aerating moistening and mixing the landfill waste in a predetermined fashion, and the controlled compostion is done in a predetermined sequence.

7. A process for composting landfill waste of an existing landfill comprising:
  collecting landfill waste from said landfill;
  transferring the landfill waste to a separate controlled composting plant;
  aerating, moistening and mixing the landfill waste within the controlled composting plant to enhance and accelerate the composting of the landfill waste;
  lining the plant to prevent uncontrolled seepage of leachate from the plant.

8. The invention in accordance with claim 7 wherein the composted landfill waste is returned from the plant to the landfill.

9. The invention in accordance with claim 7 wherein clean composted soil is separately removed from the plant.

10. The invention in accordance with claim 7 including the step of reducing the odors of the landfill waste in the plant.

11. The invention in accordance with claim 7 wherein the fresh garbage is transferred to the plant for mixing with the landfill waste being composted.

12. The invention in accordance with claim 11 wherein the non biodegradable material of the fresh garbage is removed from the fresh garbage before composting in the plant.

13. The invention in accordance with claim 7 wherein the non biodegradable material is removed from the landfill waste.

14. The invention in accordance with claim 13 wherein the non biodegradable material is incinerated.

15. A process for composting landfill waste of an existing landfill comprising:
  collecting landfill waste from said landfill;
  transferring the landfill waste to a separate controlled composting plant;
  aerating, moistening and mixing the landfill waste within the controlled composting plant to enhance and accelerate the composting of the landfill waste;
  the composed landfill waste being returned from the plant to the landfill, clean composted soil is separately removed from the plant, lining the plant to prevent uncontrolled seepage of leachate from the plant, reducing the odors of the landfill waste in the plant, the fresh garbage being transferred to the plant for mixing with the landfill waste being composted, the non biodegradable material being removed from the landfill waste, the non biodegradable material being incinerated, the non biodegradable material of the fresh garbage being removed from the fresh garbage before composting in the plant.

16. A process for composting landfill waste of an existing landfill comprising:
  collecting landfill waste from said landfill;
  transferring the landfill waste to a separate controlled composting plant;
  aerating, moistening and mixing the landfill waste within the controlled composting plant to enhance and accelerate the composting of the landfill waste;
  the landfill being unlined and only a selected sector of the unlined landfill being composted;
  lining the sector of the unlined landfill;
  sequentially composting contiguous sectors of the unlined landfill; and
  lining said contiguous sector of the unlined landfill until preselected sectors of the unlined landfill are lined.

* * * * *